United States Patent [19]

Rolando et al.

[11] Patent Number: 5,078,925

[45] Date of Patent: * Jan. 7, 1992

[54] PREPARING POLYPROPYLENE ARTICLES

[75] Inventors: Richard J. Rolando, Oakdale, Minn.; Dennis L. Krueger, Hudson, Wis.; Daniel E. Meyer, Stillwater; Thomas L. Insley, Lake Elmo, both of Minn.

[73] Assignee: Minnesota Mining and Manufacturing Company, St. Paul, Minn.

[*] Notice: The portion of the term of this patent subsequent to Jun. 5, 2007 has been disclaimed.

[21] Appl. No.: 545,482

[22] Filed: Jun. 27, 1990

Related U.S. Application Data

[60] Division of Ser. No. 326,409, Mar. 20, 1989, Pat. No. 4,950,549, which is a continuation of Ser. No. 69,040, Jul. 1, 1987, abandoned.

[51] Int. Cl.$^5$ ............................................. B29C 35/10
[52] U.S. Cl. ....................................... 264/6; 264/7; 264/12; 264/22; 264/129; 264/178 F; 264/211.13; 264/211.14; 264/216; 264/236; 264/347; 427/44; 156/167; 156/275.5
[58] Field of Search ................. 264/22, 6, 12, 7, 237, 264/129, 348, 236, 178 F, 211.13, 211.14, 216, 347; 425/174.4; 427/44; 156/167, 275.5

[56] References Cited

U.S. PATENT DOCUMENTS

| | | | |
|---|---|---|---|
| 3,449,154 | 6/1969 | Katz | 117/93.1 |
| 3,634,218 | 1/1972 | Gotohda et al. | 204/159.17 |
| 3,635,631 | 1/1972 | Fields | 425/223 |
| 3,755,527 | 8/1973 | Keller et al. | 264/210 F |
| 3,870,567 | 3/1975 | Palmer et al. | 136/148 |
| 3,886,056 | 5/1975 | Kitamaru et al. | 264/22 |
| 3,940,325 | 2/1976 | Hirao | 204/159 |
| 3,959,421 | 5/1976 | Weber et al. | 264/6 |
| 3,987,001 | 10/1976 | Wedel et al. | 260/32.8 |
| 4,049,757 | 9/1977 | Kammel et al. | 264/22 |
| 4,110,185 | 8/1978 | Williams et al. | 304/159 |
| 4,113,595 | 9/1978 | Hagiwara et al. | 204/159.17 |
| 4,274,932 | 6/1981 | Williams et al. | 204/159.2 |
| 4,367,185 | 1/1983 | Nojiri et al. | 264/22 |
| 4,407,846 | 10/1983 | Machi et al. | 427/35 |
| 4,431,497 | 2/1984 | Rekers | 204/159.2 |
| 4,460,445 | 7/1984 | Rekers | 204/159.2 |
| 4,467,065 | 8/1984 | Williams et al. | 534/296 |
| 4,478,772 | 10/1984 | Takagi et al. | 264/22 |
| 4,569,736 | 2/1986 | Kosegaki et al. | 523/105 |
| 4,582,656 | 4/1986 | Hoffmann | 264/22 |
| 4,594,203 | 6/1986 | Hagiwara et al. | 264/22 |
| 4,595,726 | 6/1986 | Klosiewicz | 525/71 |
| 4,931,230 | 6/1990 | Krueger et al. | 264/22 |

FOREIGN PATENT DOCUMENTS

| | | | |
|---|---|---|---|
| 44-9837 | 5/1969 | Japan | 264/22 |
| 56-63424 | 5/1981 | Japan | 264/22 |
| 867646 | 5/1961 | United Kingdom | 264/22 |

OTHER PUBLICATIONS

Rolando, R. J. et al., "The Influence of Morphology in the Tensile Properties of Polypropylene," ACS Polymer Material Science & Engineering, 52, 1985, pp. 76–79.

(List continued on next page.)

Primary Examiner—Jeffery Thurlow
Attorney, Agent, or Firm—Gary L. Griswold; Walter N. Kirn; Carole Truesdale

[57] ABSTRACT

Polypropylene articles are provided. The polypropylene articles include non-crystalline mesomorphous polypropylene having olefinic unsaturation-containing monomers graft-polymerized thereon by ionizing radiation in a dosage sufficient to degrade crystalline polypropylene. The irradiated polypropylene articles retain useful tensile properties after storage periods of as long as at least about four months. Further provided is a method for preparing irradiation polypropylene articles having olefinic unsaturation-containing monomers graft-polymerized thereon including the steps of melt extruding polypropylene; quenching the extruded polypropylene immediately after extrusion to provide non-crystalline mesomorphous polypropylene; coating the non-crystalline mesomorphous polypropylene with an ionizing radiation graft-polymerizable monomer; and irradiating the coated non-crystalline mesomorphous polypropylene with a dosage of ionizing radiation sufficient to degrade crystalline polypropylene and sufficient to effect graft-polymerization of the monomer onto the surface of the polypropylene.

9 Claims, 2 Drawing Sheets

OTHER PUBLICATIONS

Shkolnik, S. et al., "Radiation-Induced Grafting of Sulfonates on Polyethylene" J. of Applied Polymer Science, 27, 1982, pp. 2189–2196.

Wente, Van A., Superfine Thermoplastic Fibers, *Industrial Eng. Chemistry,* vol. 48, No. 8, Aug. 1956, pp. 1342–1346.

Williams, J. L., "Radiation Stability of Polypropylene," ANTEC 1987, p. 1198.

Pinner, S. H. ed., *Weathering and Degradation of Plastics,* Gordon & Breach, Science Publishers, Inc., NY 1966, pp. 104–107.

P. H. Geil, *Polymer Single Crystals,* Interscience, N.Y. 1963, p. 270.

Report No. 4364 of the Naval Research Laboratories, Published May 25, 1954, Manufacture of Superfine Organic Fibers, Wente, Van A. et al.

R. L. Miller, On the Existence of Near-Range Order in Isotactic Polypropylenes *Polymer,* 1, 135 (1960).

Kawase, Kaoru et al., Thermal Propeties of Methyl Methacrylate-Grafted Polypropylene Fibers, Nippon Kagaku Kaishi, 1972 (8), 1432–7.

Natta, G. et al., Structure and Properties of Isotactic Polypropylene *Del Nuovo Cimento,* Supplemento Al, vol. XV, Series X, N.1, 1960, pp. 40–51.

Nishimoto, S. et al., "Material Design of Radiation Resistant Polypropylene: Part II–Importance of the Smectic Structure Produced by Quenching Treatment", Polymer Degradation and Stability, 14, 1986, pp. 199–208.

Chemical Abstracts, vol. 77, 1972, p. 75, Abstract No. 153607t.

Higdon, A., *Mechanics of Materials,* John Wiley &sons, Inc., NY, 1976, pp. 104–106.

Hsiue et al., Preirradiation Grafting of Acrylic & Methacrylic Acid Onto Polyethylene Films: Preparation & Properties, *J. of Applied Polymer Science* 30, 1023–33, (1985).

PREPARING POLYPROPYLENE ARTICLES

This is a division of application Ser. No. 07/326,409 filed Mar. 20, 1989 now U.S. Pat. NO. 4,950,549 issued 8/21/90 which is a continuation of application Ser. No. 07/069,040 filed July 1, 1987, abandoned.

BACKGROUND OF THE INVENTION

1. Field of the Invention

This invention relates to irradiated polypropylene articles, such as fibers, films, and nonwoven fabrics and to a method for preparing such articles.

2. Background Information

Polypropylene is often a material of choice for articles such as fiber, films and molded articles due to its various properties such as non-toxicity and inertness as well as its low cost and the ease with which it can be extruded, molded, and formed into articles. It is often desirable to graft-polymerize monomers onto polypropylene substrates using ionizing radiation, e.g., electron beam radiation, to provide such properties as hydrophilicity, hydrophobicity, increased adhesion to adhesives, surfaces on which secondary reactions can occur, and ion exchange capacity. However, polypropylene treated with ionizing radiation is subject to degradation, e.g., embrittlement, discoloration, and thermal sensitivity, during or subsequent to irradiation.

The addition of various stabilizers, e.g., antioxidants, to the polypropylene material has been suggested to prevent discoloration and degradation.

U.S. Pat. No. 4,110,185 (Williams et al.) discloses irradiation sterilized articles of polypropylene which have incorporated therein a mobilizer which increases the free volume of the polymer and, therefore, lowers the density of the polymer. Suitable mobilizers mentioned include hydrocarbon oils, halogenated hydrocarbon oils, phthalic ester oils, vegetable oils, silicone oils, and polymer greases.

U.S. Pat. No. 4,113,595 (Hagiwara et al.) discloses irradiated crosslinked polyolefin molded products of a blend of polyolefin, a compound having acetylenic linkage, and an aromatic hydrocarbon-substituted organic amine or an aromatic secondary amino compound.

U.S. Pat. Nos. 4,274,932 and 4,467,065 (Williams et al.) disclose polypropylene stabilized for irradiation sterilization. The polypropylene has a narrow molecular weight distribution and has incorporated therein a mobilizer, as used in U.S. Pat. No. 4,110,185, described hereinabove.

U.S. Pat. No. 4,432,497 (Rekers) discloses radiation-stable polyolefin compositions containing a benzhydrol or benzhydrol derivative stabilizer.

U.S. Pat. No. 4,460,445 (Rekers) discloses radiation-stable polyolefin compositions containing a hindered phenolic stabilizer and a benzaldehyde acetal stabilizer.

European Patent Application No. 0,068,555 (Lenzi) discloses irradiation-sterilizable polypropylene articles, the polypropylene having one to eight weight percent low density polyethylene added thereto.

U.S. Pat. No. 3,987,001 (Wedel et al.) discloses an ultraviolet protectorant composition for surface application by aerosol to polyolefins, which composition contains a 2-hydroxy benzophenone and benzoate ester ultraviolet protectorant, a polymethacrylate binder, a solvent, and propellant.

Although the addition of the various stabilizers to polypropylene serves to diminish degradation by radiation, the use of additives increases costs, some additives may pose toxicological problems when contacted with pharmaceuticals, and some additives may adversely affect the physical properties of the polypropylene. Also, when the polypropylene is subjected to high temperatures during processing, e.g., such as occurs during blown microfiber web extrusion, the additives, especially antioxidants, are often destroyed, i.e., decomposed. The present invention overcomes these problems without addition of radiation stabilizing additives as required in the afore-mentioned Williams et al. '185, '932, and '065, Hagiwara et al. '595, Rekers '497 and '445, Lenzi '555, and Wedel '001 patents, and provides low cost polypropylene articles having graft-polymerized monomers thereon and a method for preparing irradiated polypropylene articles, with the articles retaining useful tensile properties even after prolonged storage periods.

SUMMARY OF THE INVENTION

The present invention provides polypropylene articles of non-crystalline mesomorphous polypropylene, which polypropylene need not contain radiation stabilizing additives, and the polypropylene having olefinic unsaturation-containing monomers graft-polymerized thereon by ionizing radiation in a dosage sufficient to degrade crystalline polypropylene. The irradiated articles such as films retain useful tensile properties after storage periods of as long as at least four months. For example, films of the invention generally retain an elongation at break of at least 200 percent, preferably at least 300 percent, after irradiation, and blown microfiber webs of the elongation at break that they exhibited prior to irradiation. Blown microfiber webs generally retain a modulus of resilience of at least about 20 N-m/cm$^3$, preferably 30 N-m/cm$^3$.

The invention further provides a method for preparing irradiated polypropylene articles, the steps of which include: extruding polypropylene, which polypropylene need not contain radiation stabilizing additives; quenching the extruded polypropylene immediately after extrusion to provide non-crystalline mesomorphous polypropylene; coating at least a portion of the surface of non-crystalline mesomorphous polypropylene with an ionizing radiation graft-polymerizable monomer; and irradiating the non-crystalline mesomorphous polypropylene with a dosage of ionizing radiation that would degrade crystalline polypropylene and is sufficient to effect graft-polymerization of the monomer. The irradiated articles, after six months storage, are substantially undegraded.

Although non-crystalline, mesomorphous polypropylene is known (Natta, G., et al. Structure and Properties of Isotactic Polypropylene, *Del Nuovo Cimento*, Supplemento Al, Volume XV, Serie X, N.1, 1960, pp. 40–51) the present invention for the first time, insofar as known, applies a dose of ionizing radiation to non-crystalline, mesomorphous polypropylene to achieve non-degraded polypropylene products having monomer graft-polymerized thereto or a coating cured in situ thereon. In fact, it has been thought that crystalline regions in polypropylene provide oxygen-impermeable regions which limit the extent of oxidation and reduce the maximum oxidation rate, and that readily-accessible amorphous regions were preferentially attacked (Pimer, S.H., ed., *Weathering and Degradation of Plastics*, Gordon and Breach, Science Publishers Inc., New York, 1966, pp. 104-107).

It is suspected that the radiation stability of the non-crystalline mesomorphous polypropylene is related to control of the morphology. The non-crystalline mesomorphous polypropylene has been described as a non-spherulitic structure by P. H. Geil (*Polymer Single Crystals*, Interscience, N.Y., 1963, p. 270). Crystalline polypropylene may have "chain-folds", i.e., crystalline/amorphous folds, in the structure which provide areas for radical attack because of their higher energy. In contrast, the non-crystalline mesomorphous structure is believed to have ordering as in a Fringed Micelle model with no chain-fold defects. It is suspected that this lack of chain fold defects minimizes the number of sites for radical attack and thereby provides the resistance to radiation degradation.

DETAILED DESCRIPTION OF THE INVENTION

Polypropylene to be used in products of the invention can be extruded from polymer melt in any shape which can be rapidly cooled throughout after extrusion to obtain non-crystalline mesomorphous polypropylene. The shape and/or thickness of the extruded material will be dependent on the efficiency of the quenching systems utilized. Generally, films, fibers, and blown microfiber webs are the preferred extruded materials. The extruded polypropylene should not be subjected to any treatment at temperatures above about 140° F. (60° C.), such as annealing, orientation, or stretching, prior to irradiation as such treatment can change the non-crystalline mesomorphous polypropylene structure to a predominantely crystalline structure. After irradiation, the polypropylene can be annealed, stretched, or oriented, if properties provided by such treatments are desired.

The polypropylene may contain conventional additives such as antistatic materials, dyes, plasticizers, ultraviolet absorbers, nucleating agents, surfactants, and the like. The amount of additives is typically less than ten weight percent of the polymer component, preferably less than two percent by weight.

Figure 1:
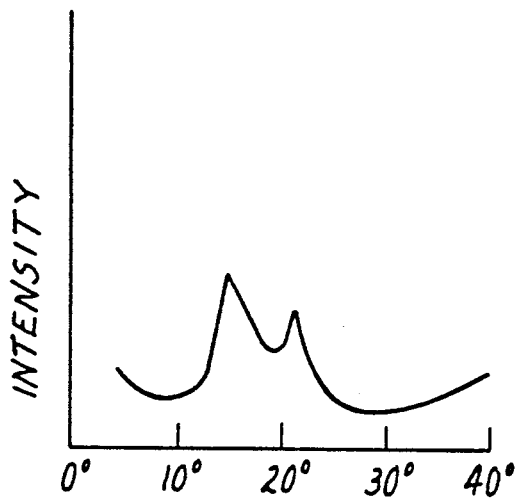
FIG. 1 is the X-ray diffraction pattern of the non-crystalline mesomorphous polypropylene film of Example 1.
Figure 2:
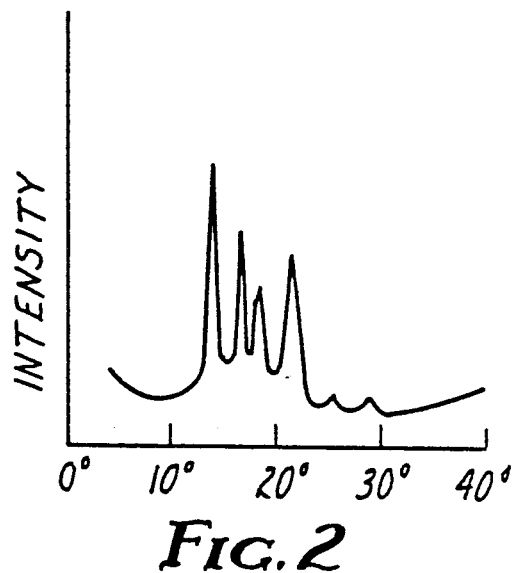
FIG. 2 is the X-ray diffraction pattern of the crystalline polypropylene film of Comparative Example 2.
Figure 5:
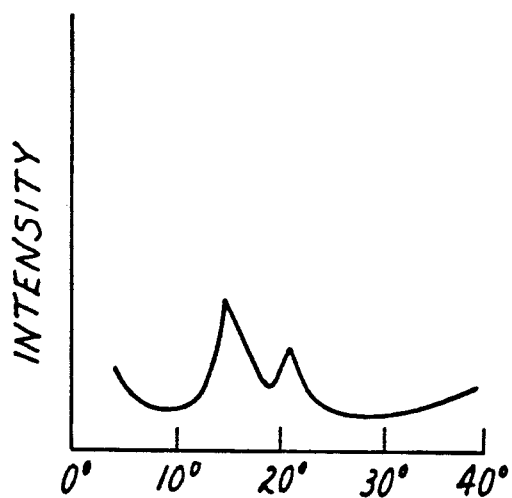
FIG. 5 is the X-ray diffraction pattern of the non-crystalline mesomorphous polypropylene blown microfiber web of Example 7.
Figure 6:
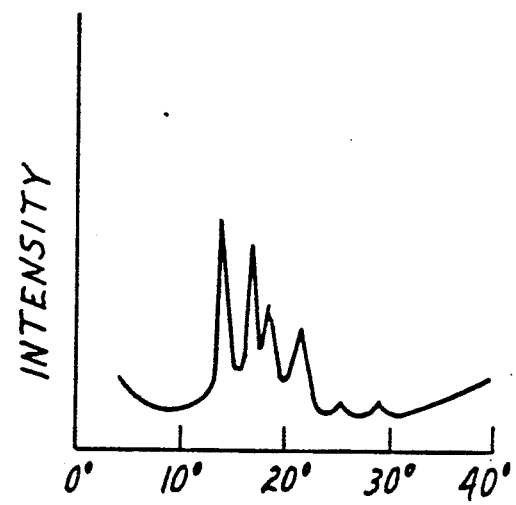
FIG. 6 is the X-ray diffraction pattern of the crystalline polypropylene blown microfiber web of Comparative Example C9.

To obtain the non-crystalline mesomorphous phase polypropylene, the extruded material must be quenched immediately after extrusion before the material reaches the crystalline state. The presence of the non-crystalline mesomorphous phase polypropylene can be confirmed by X-ray diffraction. FIGS. 1 and 5 are X-ray diffraction patterns for mesomorphous polypropylene and FIGS. 2 and 6 are X-ray diffraction patterns for crystalline polypropylene. Although the term "non-crystalline mesomorphous" or "mesomorphous" is used to describe the polypropylene useful in the present invention, the material contains some crystalline phase polypropylene as determined by density measurements using a gradient column. Generally, the percent crystallinity of the non-crystalline mesomorphous polypropylene is below about 45 percent.

Various known methods of quenching can be used to obtain the non-crystalline mesomorphous structure including plunging the extruded material into a cold liquid, e.g., ice water bath, spraying the extruded material with a liquid such as water, and/or running the extruded material over a cooled roll or drum.

Extruded polypropylene film is preferably quenched by contact with a quench roll or by plunging the film into a quench bath, such as an ice-water bath as disclosed by R. L. Miller ("On the Existence of Near-range Order in Isotactic Polypropylenes", *Polymer*, 1, 135 (1960). Where a quench roll is used, the roll temperature is preferably maintained at a temperature below about 75° F. (24° C.) and the film is generally in contact with the roll until solidified. The quench roll should be positioned relatively close to the extruder die, the distance being dependent on the roll temperature, the extrusion rate, the film thickness, and the roll speed. Generally, the distance from the die to the roll is about 0.1 in (0.25 cm) to 2 in (5 cm). Where a quench bath is used, the bath temperature is preferably maintained at a temperature below about 40° F. (4° C.). The bath should be positioned relatively close to the die, generally about 0.1 in (0.25 cm) to 5 in (13 cm) from the die to the bath.

Polypropylene melt blown microfibers are produced by extruding molten polymer through a die into a high velocity hot air stream to produce fibers having an average fiber diameter of less than about 10 microns. The fibers are generally collected on a drum in the form of a web. The preparation of microfiber webs is described in Report No. 4364 of the Naval Research Laboratories, published May 25, 1954, entitled "Manufacture of Superfine Organic Fibers," by Wente, Van A. et al. and in Wente, Van A., "Superfine Thermoplastic Fibers" in *Industrial Engineering Chemistry*, Vol. 48, No. 8, August, 1956, pp. 1342-1346.

To achieve non-crystalline, mesomorphous polypropylene webs, the blown microfiber web is preferably quenched by spraying with a liquid such as water or by cooling the collector drum onto which the microfiber web is collected. Optimum quenching can be achieved by spraying the fiber web near the die, then collecting the web on a cooled drum. The water spray is preferably at a temperature of less than about 50° F. (10° C.) and less than about 1 inch (2.5 cm) from the die and the collector drum is preferably about 2 in (5 cm) to 4 in (10 cm) from the die, but can-be as much as 8 in (20 cm) to 10 in (25 cm) depending on extrusion rates.

The non-crystalline mesomorphous phase polypropylene can have graft-polymerized thereto monomers which are commonly used to modify surface characteristics of polyolefin substrates such as those described in Hsiue et al., Preirradiation Grafting of Acrylic and Methacrylic Acid onto Polyethylene Films:Preparation and Properties. *J. of Applied Polymer Science*, 30, 1023-33 (1985) and Shkolnik et al., Radiation-Induced Grafting of Sulfonates On Polyethylene. *J. of Applied Polymer Science*, 27, 2189-2196 (1982) and U.S. Pat. No.

3,634,218 (Gotohda) which are incorporated herein by reference for that purpose. For example, adhesion promoting primers such as N,N-dimethylacrylamide, glycidyl acrylate and diisopropylacrylamide for use with acrylate adhesives, glycidyl acrylate, trimethylolpropane triacrylate, and hydroxyethyl acrylate for use with epoxy adhesives, and N,N-dimethylaminoethylacrylate, N-vinyl-2-pyrrolidone and 2-vinyl pyridine for use with cyanoacrylate adhesives can be graft-polymerized onto the surface of the non-crystalline mesomorphous phase polypropylene. Monomers which provide hydrophilicity to the surface of the polypropylene substrate such as acrylic acid, N-vinyl-2-pyrrolidone and sulfoethyl methacrylate can be graft-polymerized onto the polypropylene substrate.

The following non-limiting examples are provided to further illustrate the invention. In these examples, the following tests were used to characterize the polypropylene films and microfiber webs:

*Tensile properties (film)*: Samples of film ½ in (1.25 cm) wide were tested for yield stress and elongation at break using an Instron ™ model no. 1122 at a gauge length of 2 in (5 cm) and a crosshead speed of 2 in/min (5 cm/min).

*Tensile properties* (microfiber web): One-inch wide samples were tested for energy required to stretch to yield point using an Instron ™ model no. 1122 at a gauge length of 0.08 in (2 mm), a crosshead speed of 2 in/min (5 cm/min), chart speed of 50 in/min (125 cm/min), and full scale of 2 kg. The modulus of resilience is calculated as described in Higdon, A., *Mechanics of Materials*, John Wiley & Sons, Inc., N.Y., 1976, pgs 104–106.

180° Peel adhesion:

A 2.5 cm wide, 20.3 cm long strip of pressure-sensitive adhesive tape (Scotch ™ brand tape no. is adhered to a 10.1 cm wide, 15.2 cm long sheet of test substrate with a free end of the tape extending beyond the end of the test substrate. The sample is rolled twice with a 1.35 kg hard rubber roller to ensure contact between the adhesive and the test substrate. The sample is aged at room temperature (22° C.) for 24 hours. The free end of the tape is removed from the test substrate at a rate of 6 inches/minute using a Slip/Peel Tester, available from Instrumentors, Inc.

EXAMPLE 1 AND COMPARATIVE EXAMPLE C1

Polypropylene films were prepared from Cosden 8670 polypropylene polymer (melt flow index 4; average molecular weight, by GPC-204,000) using a 1¼ in (3.2 cm) Brabender ™ extruder with a 12 in (30.5 cm) wide film die at a thickness of about 1.5 mil (0.04 mm) under the following conditions:

Melt temperature (°C.): 206
Screw speed (rpm): 47
Polymer flow rate (kg/hr): 4.7
Die temperature (°C.): 204

The films were extruded onto a chrome-plated 3 in (7.6 cm) diameter casting roll spaced one-inch (2.5 cm) from the die. The film was in contact with the roll for about 2.5 seconds. The roll was maintained at 44° F. (6.7° C.) and 150° F. (65.5° C.) to provide non-crystalline mesomorphous film (Example 1) and crystalline film (Comparative Example 1), respectively.

Each film was coated with a solution containing 99.9 weight percent acrylic acid and 0.1 weight percent wetting agent (FC-430, available from 3M Company).

The films were irradiated using an electron beam at a dosage of 5 Mrad in an inert (nitrogen) atmosphere to effect graft polymerization of the acrylic acid onto the polypropylene films. Control films without the acrylic acid coating were also exposed to 5 Mrad electron beam irradiation. Non-irradiated, graft-polymerized, and control films were tested for yield stress and elongation at break after 4 months storage at 70° F. (21° C.). The results are shown in Table I.

TABLE I

|  | Example 1 | | Comparative Example 1 | |
| --- | --- | --- | --- | --- |
|  | Yield Stress (kg/cm$^2$) | Elongation at break (%) | Yield Stress (kg/cm$^2$) | Elongation at break (%) |
| Non-irradiated | 160 | 730 | 229 | 880 |
| Irradiated/ acrylic acid graft | 134 | 660 | 250 | 280 |
| Irradiated/ no graft | 151 | 640 | 223 | 520 |

The data in Table I shows that the non-crystalline mesomorphous film of Example 1 loses very little elongation at break (9.6%) after graft polymerization and storage, while the crystalline film of Comparative Example 1 exhibits a significant loss in elongation at break (68%) after graft polymerization and storage.

Figure 3:
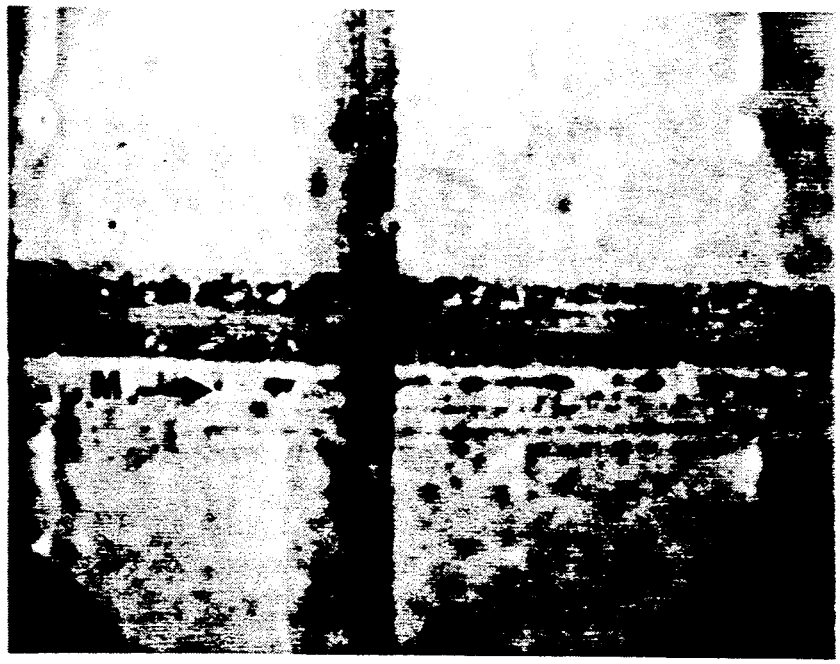
FIG. 3 is a photograph of water soluble ink applied to the surface of the film of Example 1 prior to graft polymerization.
Figure 4:
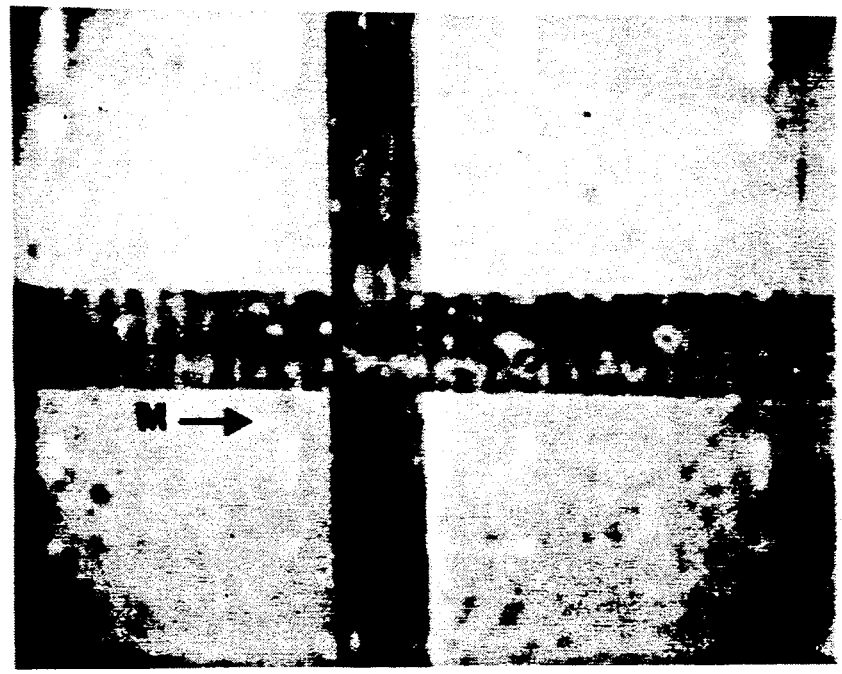
FIG. 4 is a photograph of water soluble ink applied to the surface of the film of Example 1 after graft polymerization.

Samples of the film of Example 1 before and after graft polymerization of the acrylic acid on the surface of the film were tested for hydrophilicity by applying a water-based ink on the film. FIG. 3 shows the lack of hydrophilicity of the film prior to graft polymerization of the acrylic acid as evidenced by the beads of ink formed on the surface of the film. FIG. 4 shows the hydrophilicity of the film after graft polymerization of the acrylic acid as evidenced by the sharp lines of ink on the film surface.

EXAMPLES 2–4 AND COMPARATIVE EXAMPLES C2–C6

Polypropylene films were extruded and quenched as in Example 1 and Comparative Example 1 to provide non-crystalline mesomorphous polypropylene film (Examples 2–4 and Comparative Example C2) and crystalline polypropylene film (Comparative Examples C3–C6). The films of Examples 2–4 and Comparative Examples C4–C6 were coated with a solution containing 99.9 weight percent N,N-dimethylacrylamide and 0.1 weight percent FC-430 wetting agent. The N,N-dimethylacrylamide was grafted to the films using electron beam radiation at a dose of 0.5, 2, and 5 Mrad. Comparative Examples C2 and C3 were untreated. The films were tested for 180° peel adhesion when prepared (initial) and after 2 years storage at 70° F. (21° C.) with the results set forth in Table III. The tensile properties of the untreated films and those treated with 5 Mrad dose were tested when prepared (initial) and after 4 months and 2 years storage at 70° F. (21° C.) with the results set forth in Table IV.

TABLE III

| Example | Dose (Mrad) | Peel adhesion (g/cm) | |
| --- | --- | --- | --- |
|  |  | Initial | 2 years |
| C2 | 0 | 102 | 143 |
| 2 | 0.5 | 169 | 204 |
| 3 | 2 | 377 | 392 |
| 4 | 5 | 384 | 375 |
| C3 | 0 | 127 | 163 |

TABLE III-continued

| Example | Dose (Mrad) | Peel adhesion (g/cm) | |
|---|---|---|---|
| | | Initial | 2 years |
| C4 | 0.5 | 150 | 225 |
| C5 | 2 | 257 | 380 |
| C6 | 5 | 392 | 484 |

TABLE IV

| Example | Dose (Mrad) | Time | Yield stress (kg/cm$^2$) | Elongation at break (%) |
|---|---|---|---|---|
| C2 | 0 | Initial | 164 | 700 |
| C2 | 0 | 4 mo | 154 | 655 |
| C2 | 0 | 2 yr | 172 | 620 |
| 4 | 5 | Initial | 164 | 700 |
| 4 | 5 | 4 mo | 161 | 630 |
| 4 | 5 | 2 yr | 181 | 610 |
| C3 | 0 | Initial | 241 | 800 |
| C3 | 0 | 4 mo | 252 | 750 |
| C3 | 0 | 2 yr | 266 | 620 |
| C6 | 5 | Initial | 241 | 800 |
| C6 | 5 | 4 mo | 246 | 255 |
| C6 | 5 | 2 yr | * | * |

*too brittle to test

As can be seen from the peel adhesion values in Table III, enhanced peel adhesion results from the grafting of the N,N-dimethylacrylamide on the polypropylene films with higher peel adhesion values resulting from higher doses of radiation. The data in Table IV shows that the crystalline irradiated film, Comparative Example C6, has a significant loss in elongation at break after 4 months storage and is too brittle to test after 2 years storage, while the irradiated mesomorphous polypropylene, Example 4, substantially retains its ability to elongate under stress even after a 2-year storage period.

EXAMPLE 5 AND COMPARATIVE EXAMPLE C7

Polypropylene films were extruded and quenched as in Example 1 and Comparative Example C1 to provide non-crystalline mesomorphous polypropylene film (Example 7) and crystalline polypropylene film (Comparative Example C7). Each film was coated with a solution containing 90 weight percent N-vinyl-2-pyrrolidone, 9.9 weight percent trimethylolpropane triacrylate, and 0.1 weight percent FC-430 wetting agent. The N-vinyl-2-pyrrolidone and trimethylolpropane triacrylate were grafted to the films using 5 Mrad electron beam radiation. Grafting was confirmed by iodine uptake. After a period of 1 year, the film of Comparative Example C7 had become brittle and had reduced elongation while the film of Example 5 substantially retained its tensile properties.

EXAMPLE 6 AND COMPARATIVE EXAMPLE C8

Polypropylene films were extruded and quenched as in Example 1 and Comparative Example C1 except that the polypropylene used was Exxon polypropylene 3014 (melt flow index - 12; average molecular weight, by GPC - 161,000) to provide non-crystalline mesomorphous polypropylene film (Example 6) and crystalline polypropylene film (Comparative Example C8). Each film was treated with a solution containing 90 weight percent N-vinyl-2-pyrrolidone, 9.9 weight percent trimethylolpropane triacrylate, and 0.1 weight percent FC-430 wetting agent. The N-vinyl-2-pyrrolidone and trimethylolpropane triacrylate were grafted to the films using 5 Mrad electron beam radiation. Grafting was confirmed by iodine uptake. After a period of one year, the film of Coomparative Example C8 had become brittle with reduced elongation, while the film of Example 5 substantially retained its tensile properties.

EXAMPLE 7-9 AND COMPARATIVE EXAMPLES C9-C12

Melt blown polypropylene microfiber webs having a weight of 50 g/m$^2$ were extruded, as described in Wente, Van A., "Superfine Thermoplastic Fibers", supra, using Escorene PP 3085 polypropylene polymer (available from Exxon Chemical Americas.) The fiber diameter in the webs was about 5 microns. The extruder conditions were:

Polymer rate (kg/hr/die inch): 0.45
Polymer melt temperature (°C.): 388
Air temperature (°C.): 382
Air pressure (kPa): 55

The webs of Examples 7-9 were quenched with water at a temperature of 40° F. (4° C.) and at a rate of 5 gal/hr (19 l/hr) with the spray located 6 inches (15 cm) above the die and directed at the fibers as they exited the die.

The quenched web of Example 7 was analyzed by wide angle X-ray diffraction as shown in FIG. 5 and found to be non-crystalline mesomorphous in structure.

The webs of Comparative Example C9-C12 were not quenched, producing crystalline polypropylene webs. The unquenched web of Comparative Example C9 was analyzed by wide angle X-ray diffraction as shown in FIG. 6, confirming the crystalline structure of the fibers in the web.

The webs of Examples 7-9 and Comparative Examples C10-C12 were treated with a solution containing 15 weight percent acrylic acid, 5 weight percent dichloroethane and 80 weight percent ethyl alcohol to achieve about 10 weight percent solution on the webs. The acrylic acid was grafted to the polypropylene by electron beam radiation at the dose set forth in Table V. The webs were evaluated for energy to stretch to the yield point after two weeks, four weeks, and four months. The results are set forth in Table V.

TABLE V

| Example | (Mrad) | Energy (N-m/cm$^3$) | | |
|---|---|---|---|---|
| | | 2 week | 4 week | 4 mo |
| 7 | 1 | 0.94 | 0.77 | 0.48 |
| 8 | 2 | 0.85 | 0.64 | 0.42 |
| 9 | 5 | 0.50 | 0.39 | 0.22 |
| C9 | 0 | 0.43 | 0.37 | 0.34 |
| C10 | 1 | 0.37 | 0.51 | 0.28 |
| C11 | 2 | 0.21 | 0.28 | 0.11 |
| C12 | 5 | 0.10 | 0.10 | 0.04 |

As can be seen from the data in Table V, the energy required to stretch the microfiber webs of Comparative Examples C11 and C12 had substantially decreased after four months storage, with the webs of Comparative Examples C11 and C12 not retaining useful tensile properties as evidence by the energy required to stretch the webs to their yield points of 0.11 N-m/cm$^3$ and 0.04 N-m/cm$^3$, respectively. The microfiber webs of Examples 7-9 retained sufficient useful strength after four months storage as evidenced by the energy required to stretch the webs to their yield points of 0.47 N-m/cm$^3$, 0.42 N-m/cm$^3$, and 0.22 N-m/cm$^3$., respectively.

What is claimed is:

1. A method for preparing polypropylene articles having olefinic unsaturation-containing monomers graft-polymerized thereon comprising the steps of
   melt extruding polypropylene;
   quenching said extruded polypropylene immediately after extrusion to provide non-crystalline mesomorphous polypropylene;
   coating said non-crystalline mesomorphous polypropylene with an ionizing radiation graft-polymerizable monomer; and
   irradiating said coated non-crystalline mesomorphous polypropylene with a dosage of ionizing radiation sufficient to degrade crystalline polypropylene and sufficient to effect graft-polymerization of the monomer onto the surface of the polypropylene.

2. The method of claim 1 wherein said extruded polypropylene is in the form of a blown microfiber web and quenching is achieved by application of liquid cooling spray to said extruded polypropylene.

3. The method of claim 2 wherein said spray is spaced less than about 2.5 cm from the point of extrusion.

4. The method of claim 2 wherein said spray is at a temperature of less than about 10° C.

5. The method of claim 1 wherein said extruded polypropylene is in the form of a blown microfiber web and quenching is achieved by collecting said web on a cooled collector drum.

6. The method of claim 11 wherein said drum is about 5 to 10 cm from the die.

7. The method of claim 1 wherein said extruded polypropylene is film and quenching is achieved by casting said extruded polypropylene onto a cooled casting roll.

8. The method of claim 7 wherein said casting roll is spaced about 0.25 to 5 cm from the point of extrusion.

9. The method of claim 1 wherein a sterilizing dosage of ionizing radiation between about 2.5 and 4.0 Mrad is used.

* * * * *

UNITED STATES PATENT AND TRADEMARK OFFICE
CERTIFICATE OF CORRECTION

PATENT NO. : 5,078,925
DATED : January 7, 1992
INVENTOR(S) : Richard J. Rolando, Dennis L. Krueger, Daniel E. Meyer and Thomas I. Insley It is certified that error appears in the above-identified patent and that said Letters Patent is hereby corrected as shown below:

```
          On the Title page, item,
[75] Inventors"    "Thomas L. Insley" should read
                   -- Thomas I. Insley --

Col. 5, line 36    "tape no. is" should read
                   -- tape no. 8411) is --
```

Signed and Sealed this

Fifteenth Day of June, 1993

*Attest:*

MICHAEL K. KIRK

*Attesting Officer*    *Acting Commissioner of Patents and Trademarks*